(12) United States Patent
Desclos et al.

(10) Patent No.: US 9,609,654 B1
(45) Date of Patent: Mar. 28, 2017

(54) BEAM STEERING TECHNIQUES APPLIED TO CELLULAR SYSTEMS

(71) Applicants: Laurent Desclos, San Diego, CA (US); Sebastian Rowson, San Diego, CA (US); Jeffrey Shamblin, San Marcos, CA (US)

(72) Inventors: Laurent Desclos, San Diego, CA (US); Sebastian Rowson, San Diego, CA (US); Jeffrey Shamblin, San Marcos, CA (US)

(73) Assignee: ETHERTRONICS, INC., San Diego, CA (US)

( * ) Notice: Subject to any disclaimer, the term of this patent is extended or adjusted under 35 U.S.C. 154(b) by 96 days.

(21) Appl. No.: 14/109,837

(22) Filed: Dec. 17, 2013

Related U.S. Application Data

(60) Provisional application No. 61/738,325, filed on Dec. 17, 2012.

(51) Int. Cl.
*H04W 4/00* (2009.01)
*H04W 72/04* (2009.01)

(52) U.S. Cl.
CPC .................................. *H04W 72/046* (2013.01)

(58) Field of Classification Search
CPC .................................................... H04W 84/12
USPC .......... 370/252–253, 328–339; 375/260–267
See application file for complete search history.

(56) References Cited

U.S. PATENT DOCUMENTS

| | | | |
|---|---|---|---|
| 9,071,301 B2* | 6/2015 | Khojastepour | |
| 2010/0238075 A1* | 9/2010 | Pourseyed | H01Q 21/28 343/702 |
| 2013/0109449 A1* | 5/2013 | Desclos | H04B 7/0413 455/575.7 |

\* cited by examiner

*Primary Examiner* — Iqbal Zaidi
(74) *Attorney, Agent, or Firm* — Coastal Patent Law Group, P.C.

(57) ABSTRACT

A cellular communication system is described where beam steering techniques are applied to fixed and mobile communication devices to increase system capacity, with capacity optimized for downlink or uplink performance. A previously described technique wherein the current mode on a single radiator is altered to vary the radiation pattern of the radiator is utilized in an FDD cellular system to generate multiple radiation patterns with low correlation between the patterns. Techniques to restrict or expand the frequency bandwidth of the beam steering technique are described to provide the capability to beam steer at receive frequencies or transmit frequencies only, and techniques are described where beam steering can occur at both transmit and receive frequency bands from a single active antenna system. The capacity per cell in the cellular system can be improved for either downlink or uplink by commanding the fixed or mobile devices to optimize correlation between radiation modes for the downlink or uplink frequencies.

12 Claims, 17 Drawing Sheets

Seven Base Terminal Layout for a Cellular System
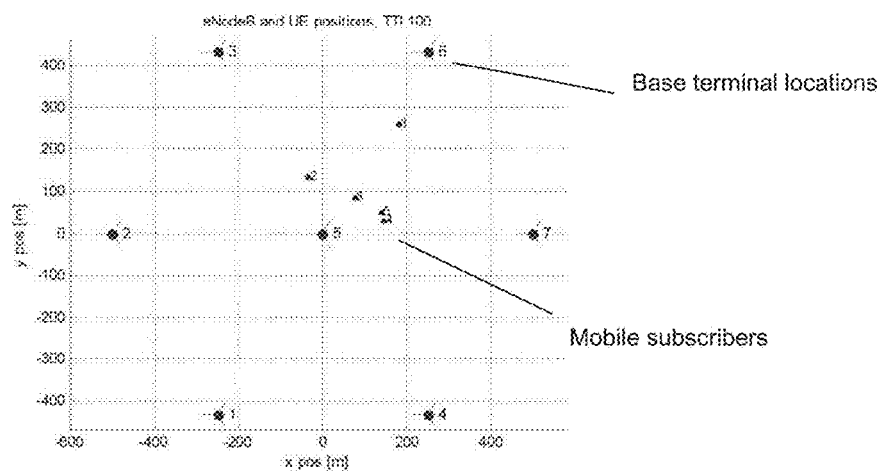
SINR mapping of cellular system
Fading characteristics provide a propagation channel that varies as a function of aspect angle
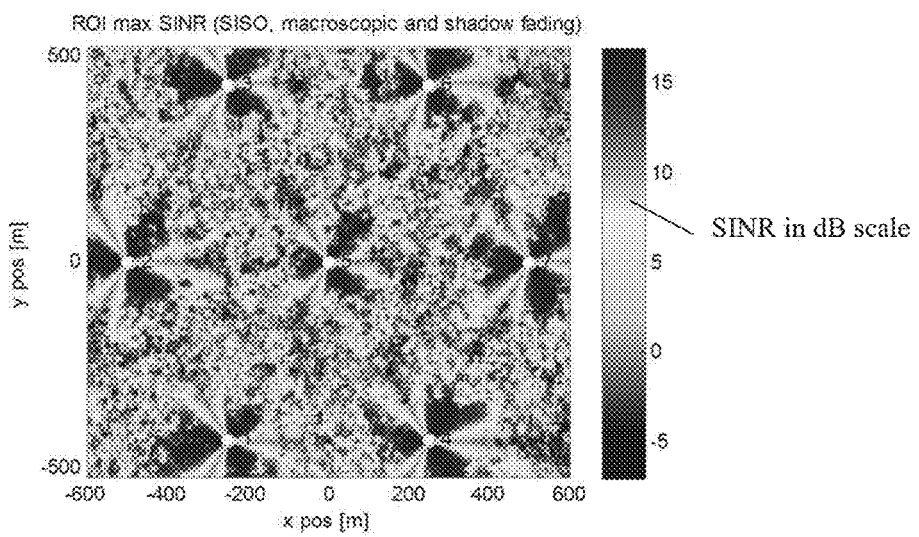
Figure 2

Friis transmission formula can be used to derive power transferred across the link

The Friis transmission equation is:

$$P_r = P_t + G_t + G_r + 20\text{Log}_{10}(\lambda/(4\pi d))$$

Where $P_t$ = transmit power in dB
$P_r$ = receive power in dB
$G_t$ = transmit antenna gain in dB
$G_r$ = receive antenna gain in dB
$\lambda$ = wavelength
$d$ = distance The last term in the equation is the path loss and can be re-written and modified to include the multipath and shadowing fade margins. For example, the ITU path loss model is $$L_{itu} = 40(1-0.004h_b)\log(d) - 18\log(h_b) + 21\log(f) + 80$$

Where $f$ = frequency in MHz.
$h_b$ = base antenna height above rooftop level in m
$d$ = distance between transmit and receive antennas in km Increasing antenna gain on mobile device results in improved SNR

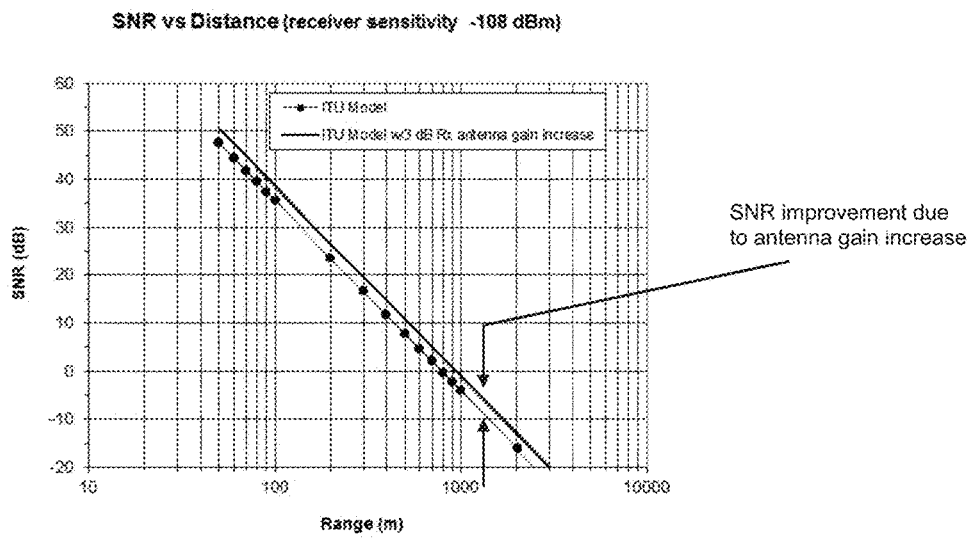

Figure 3

Channel Correlation in FDD System Optimized with Modal Antenna
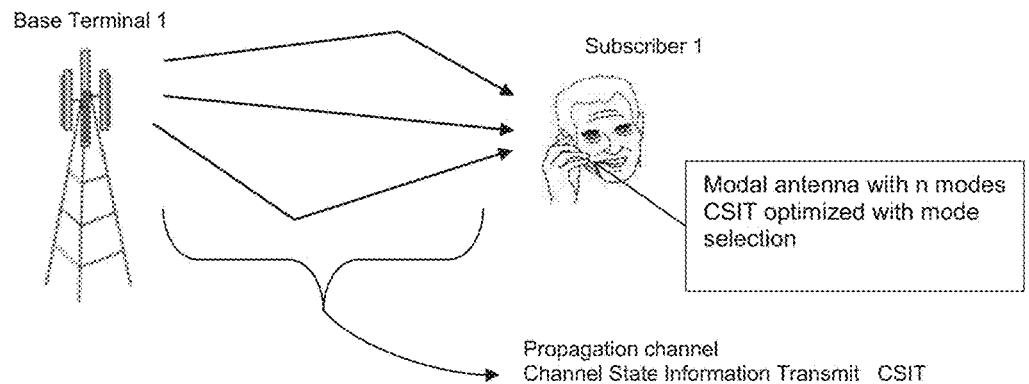
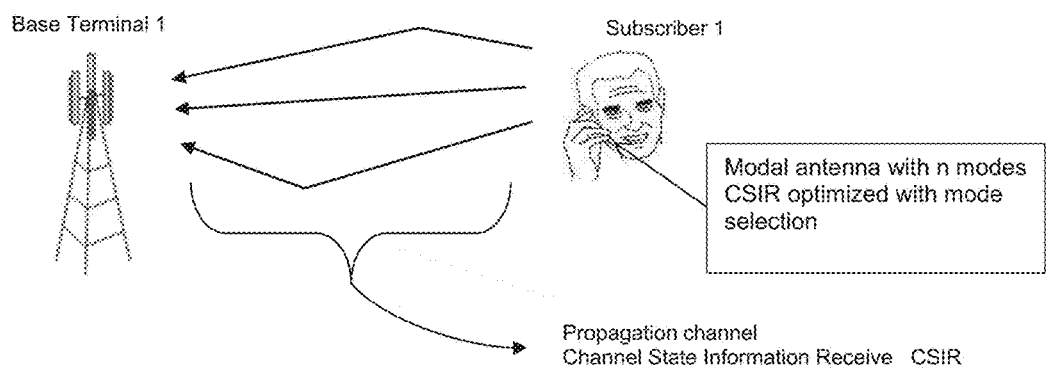
- Monitor CSIT and CSIR
- Priority decision to optimize Rx or Tx on mobile devices
- Optimize Modal antenna for channel correlation per band
Figure 4

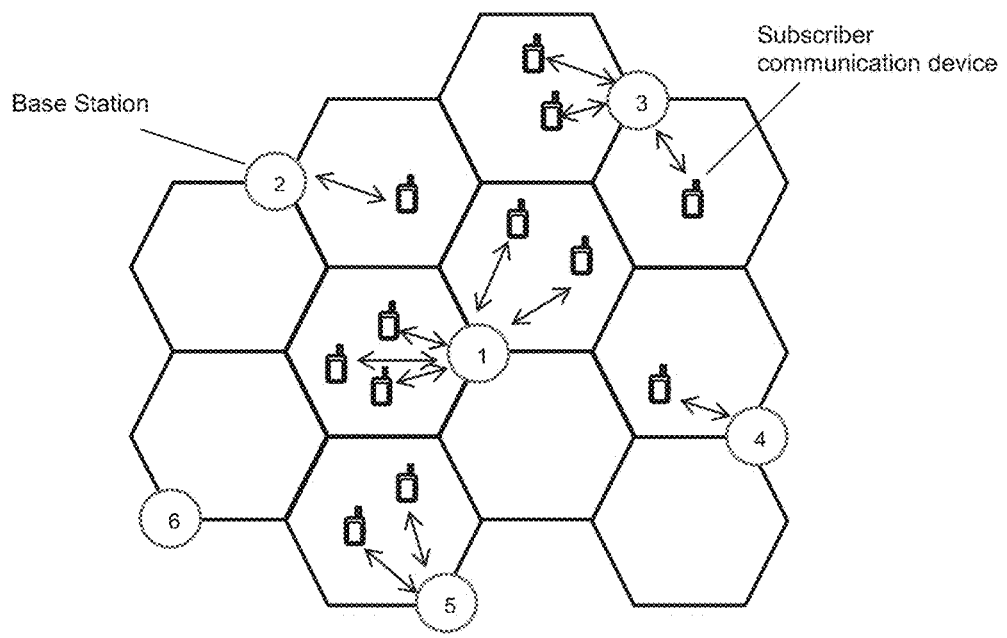
Figure 11a. Normal Cellular System Operation
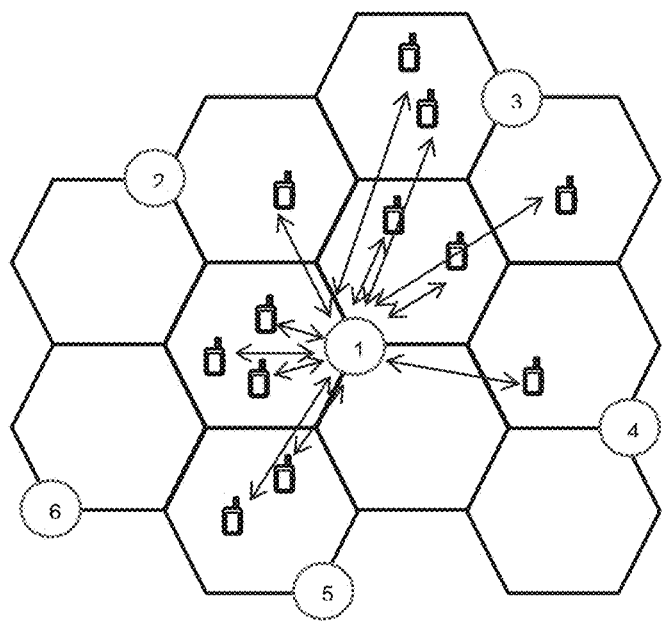
Figure 11b. Capacity Diagnostic Mode for Cellular System Coordination of modal antennas for optimized performance in heterogeneous cellular networks
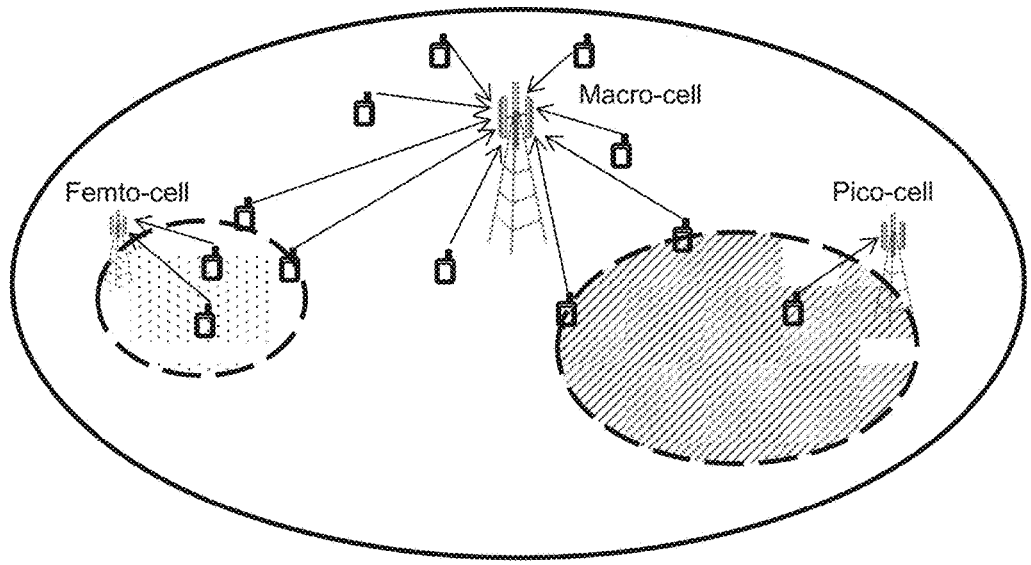
Figure 17a Inefficient use of cell resources
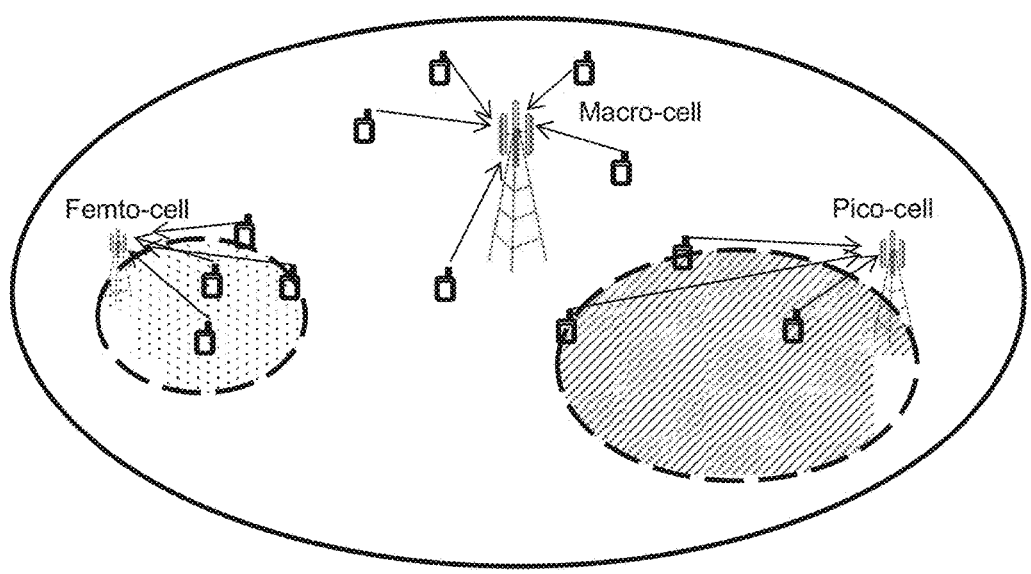
Figure 17b Improved use of cell resources

BEAM STEERING TECHNIQUES APPLIED TO CELLULAR SYSTEMS

CROSS REFERENCE TO RELATED PATENTS

This application claims benefit of U.S. Provisional Ser. No. 61/738,325, filed Dec. 17, 2012; the contents of which are hereby incorporated by reference.

SUMMARY

A cellular communication system is described where beam steering techniques are applied to fixed and mobile communication devices to increase system capacity, with capacity optimized for downlink or uplink performance. A previously described technique wherein the current mode on a single radiator is altered to vary the radiation pattern of the radiator is utilized in an FDD cellular system to generate multiple radiation patterns with low correlation between the patterns. Techniques to restrict or expand the frequency bandwidth of the beam steering technique are described to provide the capability to beam steer at receive frequencies or transmit frequencies only, and techniques are described where beam steering can occur at both transmit and receive frequency bands from a single active antenna system. The capacity per cell in the cellular system can be improved for either downlink or uplink by commanding the fixed or mobile devices to optimize correlation between radiation modes for the downlink or uplink frequencies.

BRIEF DESCRIPTION OF THE DRAWINGS

FIG. 2 illustrates a cellular communication system comprised of seven Base terminals and multiple subscribers. A mapping of SINR characteristics of the seven cell system is shown with SINR shown in a color contour plot in units of dB.

FIG. 3 illustrates and describes the Friis transmission formula. The Friis transmission formula is used to calculate the power transferred across a communication link. Modifications to the Friis formula are shown which account for multipath and shadowing effects in the propagation channel. A plot is shown which was generated using the Friis transmission formula that calculates SNR (Signal to Noise Ratio) as a function of range where the effects of increased antenna gain on one end of the communication link is shown.

FIG. 4 illustrates propagation channels for uplink and downlink between a base terminal and a subscriber. CSIT (Channel State Information Transmit) and CSIR (Channel State Information Receive) are illustrated and the concept of altering antenna characteristics on the subscriber communication device to optimize for CSIT or CSIR is noted.

FIG. 11a illustrates multiple subscriber communication devices in a cellular system. Six base stations are shown, with subscriber communication devices communicating with 5 of the six base stations. Five subscriber communication devices are communicating to base station 1.

FIG. 11b illustrates a capacity diagnostic mode implemented in a cellular system wherein subscriber communication devices in cells adjacent to base station 1 are commanded to connect to base station 1 to increase cell use.

FIG. 17 illustrates an example of how modal antennas may be used in a heterogeneous cell, consisting of a macrocell with a large area footprint and a femtocell and picocell with smaller area footprints. FIG. 17*a* shows the case in which the capacity of the cell is limited by the large number of users connected to the macrocell. FIG. 17*b* shows an improved use of cell resources, whereby some subscribers may be commanded to switch to a mode that optimizes connection with one of the smaller area cells.

DESCRIPTION OF EMBODIMENTS

Figure 1:
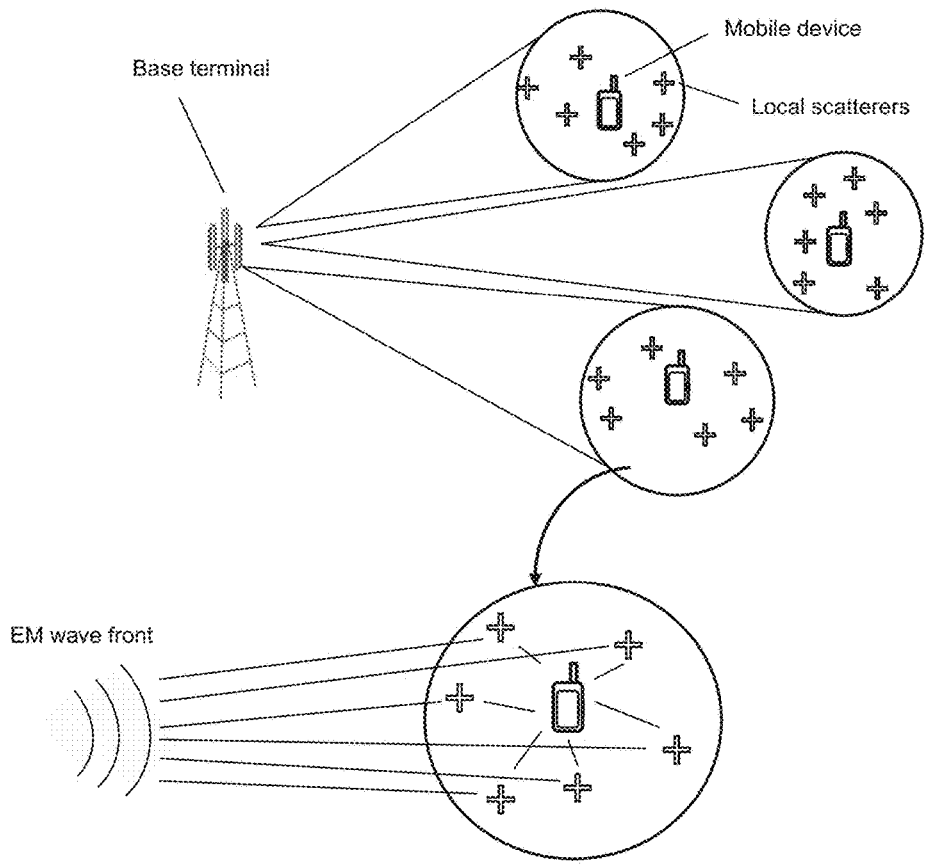
FIG. 1 illustrates a Base Terminal with directional antenna beams illuminating multiple subscribers in a cellular communication system. Local scatterers are shown in the vicinity of the subscriber communication devices. The local scatterers, when illuminated by the Base Terminal antenna system produce multiple signals that are reflected into the subscriber communication device.

Data centric mobile devices and applications are putting capacity constraints on cellular communication systems as more users move to these higher data rate devices. The growth of video file sharing is increasing the data rate requirements for both uplink and downlink in the cellular environment. New optimization techniques are required to increase data rates across a large number of subscribers, thereby reducing the need of adding additional base terminals and moving to smaller cell sizes.

Current and future cellular communication systems will require higher performance from the antenna systems on the mobile or user end to improve system capacity. As new generations of handsets, gateways, and other wireless communication devices become embedded with more applications and the need for bandwidth becomes greater, new antenna systems will be required to optimize link quality over larger bandwidths. Specifically, better control of the radiated field from the antenna system will be required to provide better communication link quality for an antenna system tasked to cover multiple frequency bands. Control and optimization of radiated performance of subscriber devices in the cellular system can be implemented to increase capacity of the existing networks.

As more subscribers migrate to higher data rate applications and devices there will be a greater need to dynamically adjust uplink and downlink radiated performance per subscriber per cell in a network. Antenna beam steering techniques are well known and utilized on the base terminal side of the cellular communication link, but are currently missing from the mobile side primarily due to size constraints of the devices in use. Current cell phones, smart phones, and tablet devices are not large enough nor have the internal volume available to support multi-element antenna arrays needed to effectuate traditional beam steering techniques.

A beam steering technique has been previously described wherein a single antenna is capable of generating multiple radiating modes. This is effectuated with the use of offset parasitic elements that alter the current distribution on the driven antenna as the reactive load on the parasitic is varied. This beam steering technique where multiple modes are generated is referred to as a modal antenna technique, and an antenna configured to alter radiating modes in this fashion will be referred to herein as a modal antenna. This antenna architecture solves the problem associated with a lack of volume in mobile devices to accommodate antenna arrays needed to implement more traditional beam steering hardware.

An early application identified for this technique is a novel receive-diversity application, wherein a single modal antenna can be configured to generate multiple radiating modes to provide a form of switched diversity. The benefits of this technique are the reduced volume required in the mobile device for a single antenna instead of a two antenna receive diversity scheme, reduction in receive ports on the transceiver from two to one, and the resultant reduction in current consumption from this reduction in receive ports.

Antenna diversity systems are often used to improve the quality and reliability of a wireless communication link. In many instances, the line of sight between a transmitter and receiver becomes blocked or shadowed with obstacles such as walls and other objects. Each signal bounce may introduce phase shifts, time delays, attenuations, and distortions which ultimately interfere at the receiving antenna. Thus, destructive interference in the wireless link is often problematic and results in a reduction in device performance. Antenna diversity schemes can mitigate interference from multipath environments by providing multiple signal perspectives. Antenna diversity can be implemented generally in several forms, including: spatial diversity, pattern diversity and polarization diversity. Spatial diversity for reception generally includes multiple antennas having similar characteristics, which are physically spaced apart from one another. Pattern diversity generally includes two or more co-located antennas with distinct radiation patterns. This technique utilizes antennas that generate directive beams and are usually separated by a short distance. Polarization diversity generally includes paired antennas with orthogonal polarizations. Reflected signals can undergo polarization changes depending on the medium through which they are traveling. By pairing two complimentary polarizations, this scheme can immunize a system from polarization mismatches that would otherwise cause signal fade.

In Frequency Division Duplex (FDD) communication systems, transmission and reception of signals are performed simultaneously by assigning different frequencies for the transmit and receive functions. A duplexer is used to connect a single antenna to the transmit and receive ports of the transceiver. A single antenna is a common configuration used in a mobile device due to volume constraints. A single passive antenna will have a fixed radiation pattern at each frequency of operation. By implementing a Modal antenna, the radiation pattern characteristics can be dynamically varied to attempt optimization in the multipath environment typically encountered in cellular systems. Proper design of the Modal antenna will allow for pattern optimization at the transmit frequency band, receive frequency band, or both.

In Time Division Duplex (TDD) communication systems, transmission and reception of signals are performed sequentially by restricting transmission of signals to a set time frame and then receiving signals for a set time frame. A common implementation of a TDD communication system is to use a single antenna along with a multi-port switch, with one port of the switch connected to a power amplifier for transmit functions, and a second port of the switch connected to a low noise amplifier for receive functions. By implementing a Modal antenna, the radiation pattern characteristics can be dynamically varied for transmit functions during the time frame that the antenna used for transmission. The radiation pattern characteristics can also be dynamically varied during reception of signals by switching antenna patterns during the receive time frame. Proper design of the communication system, primarily control of the switching scheme, will allow for pattern optimization at transmit time frames, receive time frames, or both.

In CDMA communication systems, transmission and reception occupy the same frequency bandwidth. In CDMA systems, uplink and downlink require different block and/or convolution codes due to differing propagation channel characteristics. For example, in downlink the desired signal and intra-cell interference pass through the same propagation channel. In uplink, different user channels pass through independent fading channels. Instead of a passive antenna with fixed radiation pattern characteristics, a Modal antenna can be implemented to provide dynamic adjustment of radiation pattern characteristics to better match the subscriber device to the propagation channel.

As part of throughput improvements for cellular systems, the 3 GPP release 10, which in effect sets the Long Term Evolution (LTE) standard, defines a carrier aggregation concept, where multiple frequency channels are combined to increase the instantaneous bandwidth of the transmitted or received signal. The 3 GPP release 12 defines 28 frequency band pairings, covering both inter-band and intra-band combinations. The inter-band combinations are problematic in regards to the differing amounts of propagation loss encountered as a function of frequency. Higher frequencies have higher propagation loss of the radiated signal compared to lower frequencies. Inter-band carrier aggregation will result in an increase in instantaneous bandwidth at short distances, with the instantaneous bandwidth decreasing as the distance increases due to increased propagation loss at the higher frequency band content of the aggregated signal. Using modal antenna systems in subscriber communication devices can result in less change in propagation loss between the lower and upper frequencies of the radiated signals by optimizing modal antenna performance at the higher of the two or more frequencies being aggregated.

Additionally, the 3 GPP release 10 defines support for heterogeneous networks. Heterogeneous networks consist of one or more low-power terminals, called picocells or femtocells, contained within a region covered by a high-power terminal, called a macrocell. The low-power terminals cover a smaller area, connect subscribers in different environments, such as office buildings or homes, and reduce the network loading on the macrocell. The small-area terminals are particularly advantageous for connecting users at cell edges where the smaller power footprints reduce inter-cell interference for users in neighboring cells. Furthermore, heterogeneous networks may also contain relay nodes (RNs) to connect subscribers at cell edges. These users may not have a line of sight link or enough power to establish a strong connection with the macrocell terminal. Thus, RNs are used to wirelessly relay subscriber data to the macrocell. Depending on the spatial distribution of subscribers in a cell, communication devices equipped with modal antennas may switch between different terminals and RNs to optimize capacity in a heterogeneous network.

A cellular communication system is described, wherein subscriber communication devices are optimized for transmit and/or receive performance per cell. The optimization consists of altering the radiation Mode of the subscriber communication devices to improve Channel State Information Transmit (CSIT) or Channel State Information Receive (CSIR), effectively selecting the radiation Mode of the subscriber antennas to better match the antenna radiation pattern to the propagation channel. The network makes decisions based upon cell loading to optimize multiple subscriber devices for uplink, downlink, or a combination of uplink and downlink. Commands are sent from the network to the subscriber devices to sample and select modes from the Modal antenna systems to optimize cell capacity.

The Friis transmission formula lends insight into the method of improvement provided by implementing a Modal antenna system in subscriber devices in a cellular environment. The Friis transmission equation is:

$Pr = Pt + Gt + Gr + 20 \log 10(\lambda/(4\pi d))$

Where $Pt$=transmit power in dB
$Pr$=receive power in dB
$Gt$=transmit antenna gain in dB
$Gr$=receive antenna gain in dB
$\lambda$=wavelength
$d$=distance The last term in the equation is the path loss and can be re-written and modified to include the multipath and shadowing fade margins:

$L_{Friis} = 20 \log 10\ f + 20 \log 10\ d + 32.44 + MF + SF$

Where f=frequency in MHz.
d=distance in km
MF=multipath fade margin in dB
SF=shadowing fade margin in dB A review of the Friis transmission formula shows that an increase in antenna gain on either antenna used to form the communication link will provide an increase in power transmitted across the link. Specifically, every dB of improvement in antenna gain on the mobile device side in the cellular system results in a dB of improved SNR (Signal to Noise ratio). The Friis transmission equation, which describes the free space path loss in a communication link, can be modified to account for multipath and shadowing effects on the outdoor link. By applying a multipath fade margin and a shadowing margin a path loss can be estimated for propagation in an outdoor link. A path loss model developed by the ITU for the evaluation of cellular systems can also be used to provide an estimate for range at a specific data rate. This is a statistical model based on tens of thousands of measurements and will provide an average path loss for an outdoor cellular link. The ITU path loss model is $L_{itu} = 40(1 - 0.004 h_b) \log(d) - 18 \log(hb) + 21 \log(f) + 80$ Where f=frequency in MHz.

$h_b$=base antenna height above rooftop level in m
d=distance between access point and portable unit in km The improvement in capacity in the cellular system can be derived from the Shannon-Hartley theorem which states that the channel capacity C, which is the theoretical upper bound on the information rate of un-coded data of sufficiently low bit error rate that can be sent with a given average signal power S through an analog communication channel subject to additive white Gaussian noise of power N, is C=B $\log_2$(1+S/N)
Where C=channel capacity in bits per second
B=bandwidth of the channel in Hertz
S=averaged received signal power over the bandwidth
N=average noise power over the bandwidth in watts A direct improvement on capacity will be realized as antenna gain is improved on either side of the communication link. By implementing a Modal antenna solution in a subscriber device in a cellular system the optimal radiated Mode can be selected to provide a gain increase for the link. As the propagation channel characteristics vary the Modal antenna can continue the Mode sampling process to ensure optimal radiated Mode for the current channel conditions.

For FDD (Frequency Division Duplex) systems commands are sent from the network to the subscriber devices to optimize communication link performance for uplink or downlink performance. This is effectuated by optimizing Modal antenna performance across multiple subscribers for the transmit or receive frequency band. An additional level of network optimization can be achieved by optimizing a portion of the subscribers for uplink and another portion of subscribers for downlink performance, to better balance capacity.

For CDMA communication systems, transmission and reception occupy the same frequency bandwidth. In CDMA systems, uplink and downlink can require different block and/or convolution codes due to differing propagation channel characteristics. In downlink the desired signal and intra-cell interference pass through the same propagation channel. In uplink, different user channels pass through independent fading channels. Implementation of a Modal antenna in a subscriber device in the cellular system provides an additional degree of freedom wherein the subscriber antenna can be better matched to the propagation channel by sampling multiple radiated Modes and selecting the Mode best suited for the local environment.

Implementation and control of Modal antenna systems in subscriber devices in the cellular network provides the added capability of running diagnostics to verify and de-bug cell performance issues. Fading characteristics in a cell will present a large variation in signal strength across the cell. Replacing passive antennas in subscriber devices which contain a single radiated Mode with Modal antennas containing multiple radiated Modes provide the opportunity to segregate noise related issues from multipath related effects in a cell by sampling multiple radiated Modes from subscriber devices at multiple locations in the cell. Noise related equipment failures and base terminal antenna hardware (beam forming and beam pointing for example) failures can be identified by tracking CQI metrics as radiated Modes are varied on the subscriber devices. Another system level diagnostic test that can be performed is to use the modal antennas in subscriber communication devices in the network to increase the number of users in a specific cell to test system performance as cell capacity is approached or exceeded. This diagnostic test can be performed by commanding subscriber communication devices in adjacent cells or even cells further away from a cell to connect to the base station terminal in the cell to be tested. The modal antennas provide the capability to more efficiently establish a link with adjacent cells by selecting a radiation mode that is optimal for the communication link to the cell under test. Additional subscriber communication devices can be commanded to gradually approach capacity in the cell as parameters or metrics of interest are tracked.

Modal antenna systems may also be used to improve capacity in a heterogeneous network consisting of cells containing one or more low-power terminals or one or more relay nodes (RNs). Subscriber communication devices containing modal antennas may be commanded to direct their radiation mode toward specific macrocells, low-power terminals, or RNs. This technique may be used to reduce interference for other terminals and users in a heterogeneous cell, or to increase the capacity of the cell by optimizing how users are distributed between different types of terminals and relay nodes.

Those skilled in the art will appreciate that various embodiments discussed above, or parts thereof, may be combined in a variety of ways to create further embodiments that are encompassed by the present invention.

Now turning to the drawings, FIG. 1 illustrates a Base Terminal with directional antenna beams illuminating multiple subscribers in a cellular communication system. Local scatterers are shown in the vicinity of the subscriber communication devices. The local scatterers, when illuminated by the Base Terminal antenna system produce multiple signals that are reflected into the subscriber communication device.

FIG. 2 illustrates a cellular communication system comprised of seven Base terminals and multiple subscribers. A mapping of SINR characteristics of the seven cell system is shown with SINR shown in a color contour plot in units of dB.

FIG. 3 illustrates and describes the Friis transmission formula. The Friis transmission formula is used to calculate the power transferred across a communication link. Modifications to the Friis formula are shown which account for multipath and shadowing effects in the propagation channel. A plot is shown which was generated using the Friis transmission formula that calculates SNR (Signal to Noise Ratio) as a function of range where the effects of increased antenna gain on one end of the communication link is shown.

FIG. 4 illustrates propagation channels for uplink and downlink between a base terminal and a subscriber. CSIT (Channel State Information Transmit) and CSIR (Channel State Information Receive) are illustrated and the concept of altering antenna characteristics on the subscriber communication device to optimize for CSIT or CSIR is noted.

Figure 5:
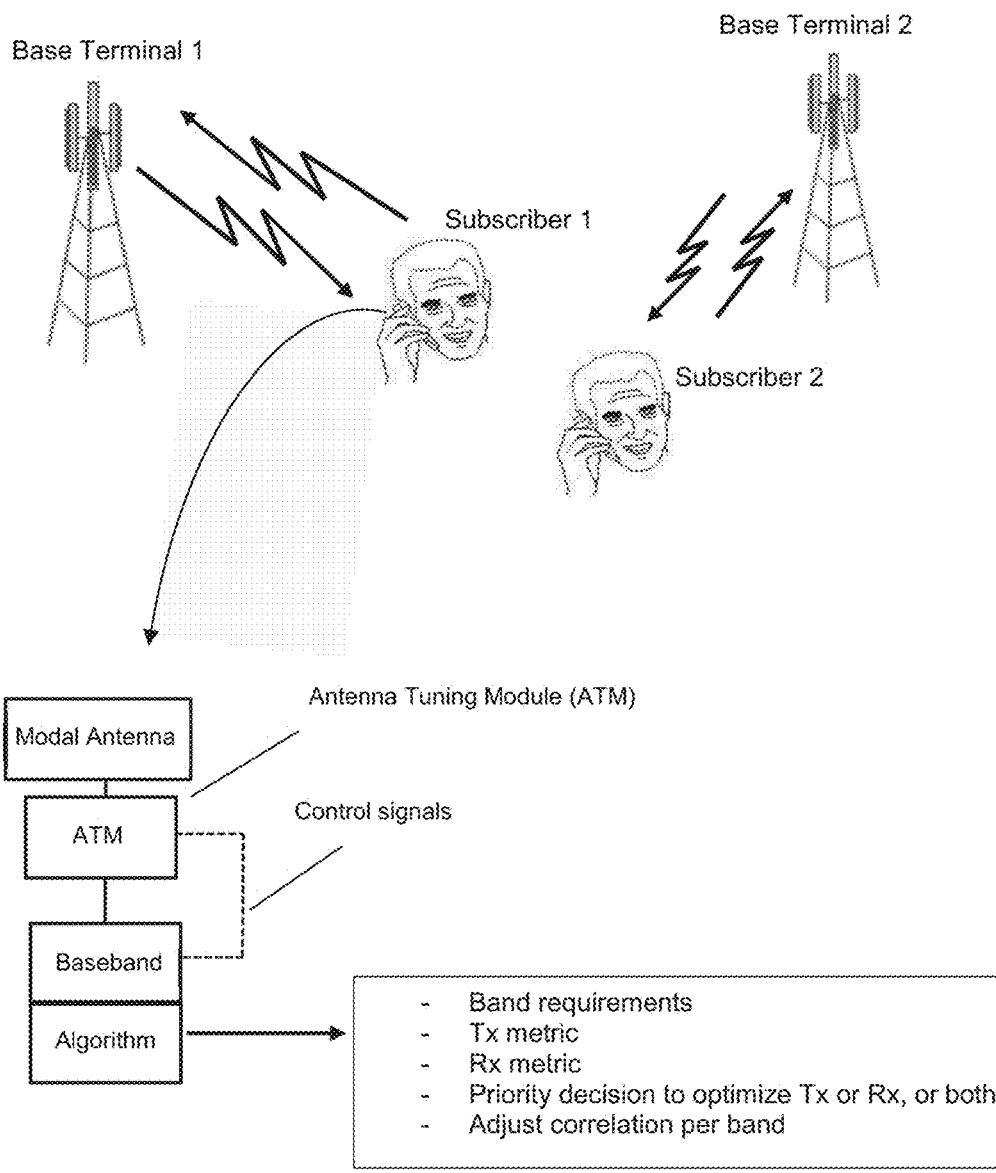
FIG. 5 illustrates a system to dynamically alter antenna performance in a subscriber device to better match antenna characteristics to the propagation channel. A Modal antenna and ATM (Antenna Tuning Module) receive commands from an algorithm in baseband based on frequency band of operation and whether to optimize transmit or receive performance.

FIG. 5 illustrates a system to dynamically alter antenna performance in a subscriber device to better match antenna characteristics to the propagation channel. A Modal antenna and ATM (Antenna Tuning Module) receive commands from an algorithm in baseband based on frequency band of operation and whether to optimize transmit or receive performance.

Figure 6:
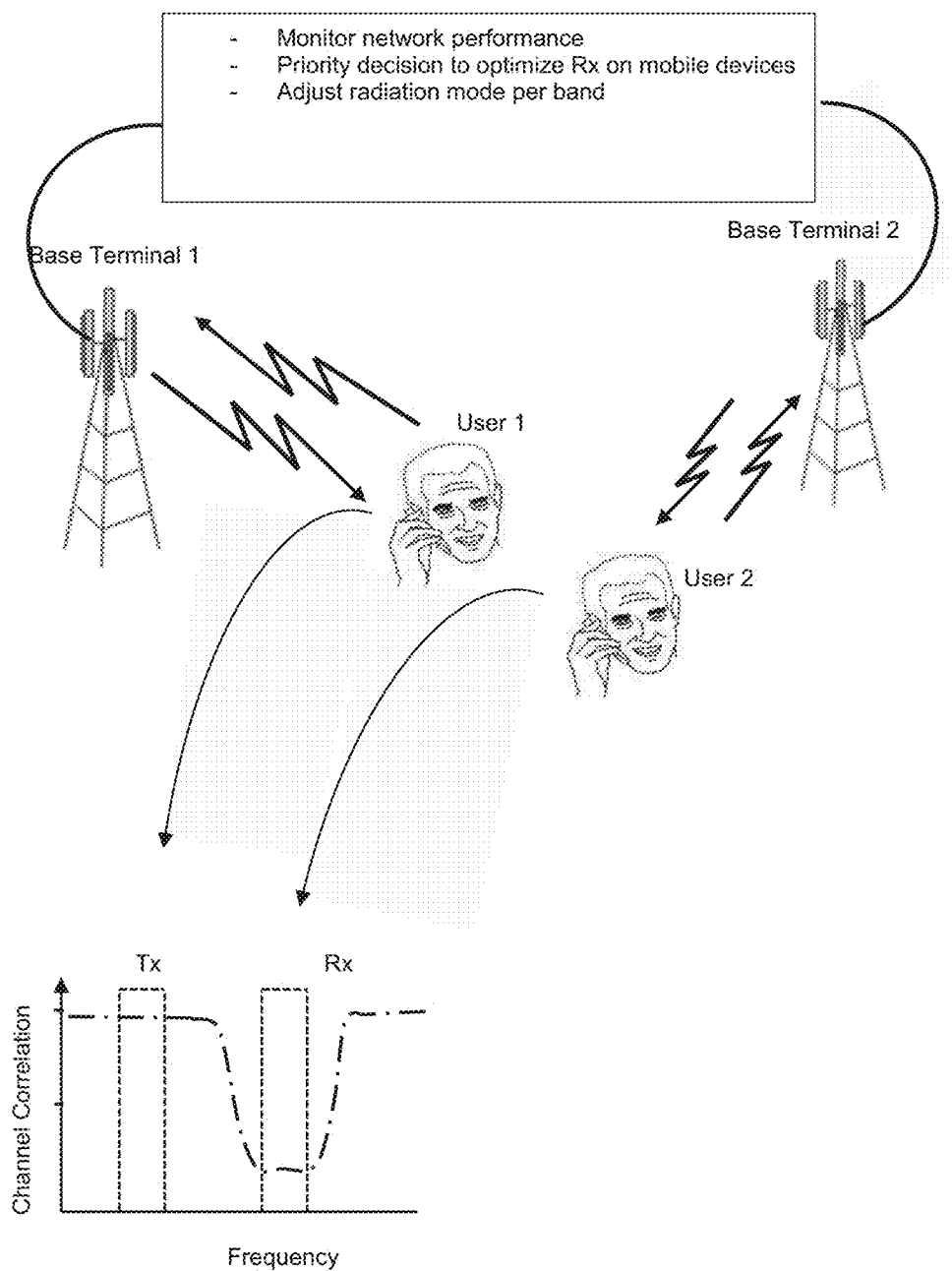
FIG. 6 illustrates a Case 1 where modal antennas in subscriber devices in a cellular network are optimized for downlink performance.

FIG. 6 illustrates a Case 1 where modal antennas in subscriber devices in a cellular network are optimized for downlink performance.

Figure 7:
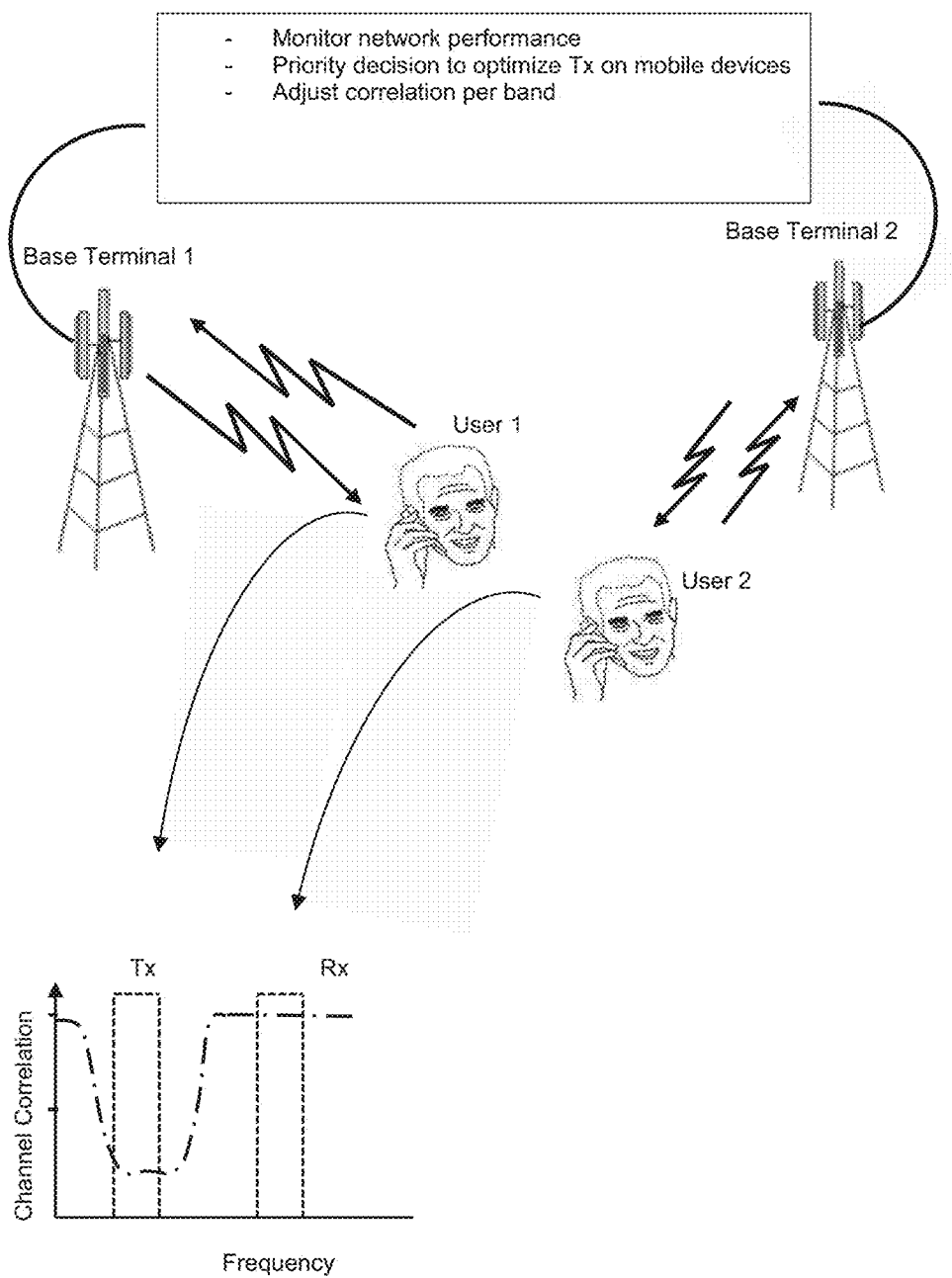
FIG. 7 illustrates a Case 2 where modal antennas in subscriber devices in a cellular network are optimized for uplink performance.

FIG. 7 illustrates a Case 2 where modal antennas in subscriber devices in a cellular network are optimized for uplink performance.

Figure 8:
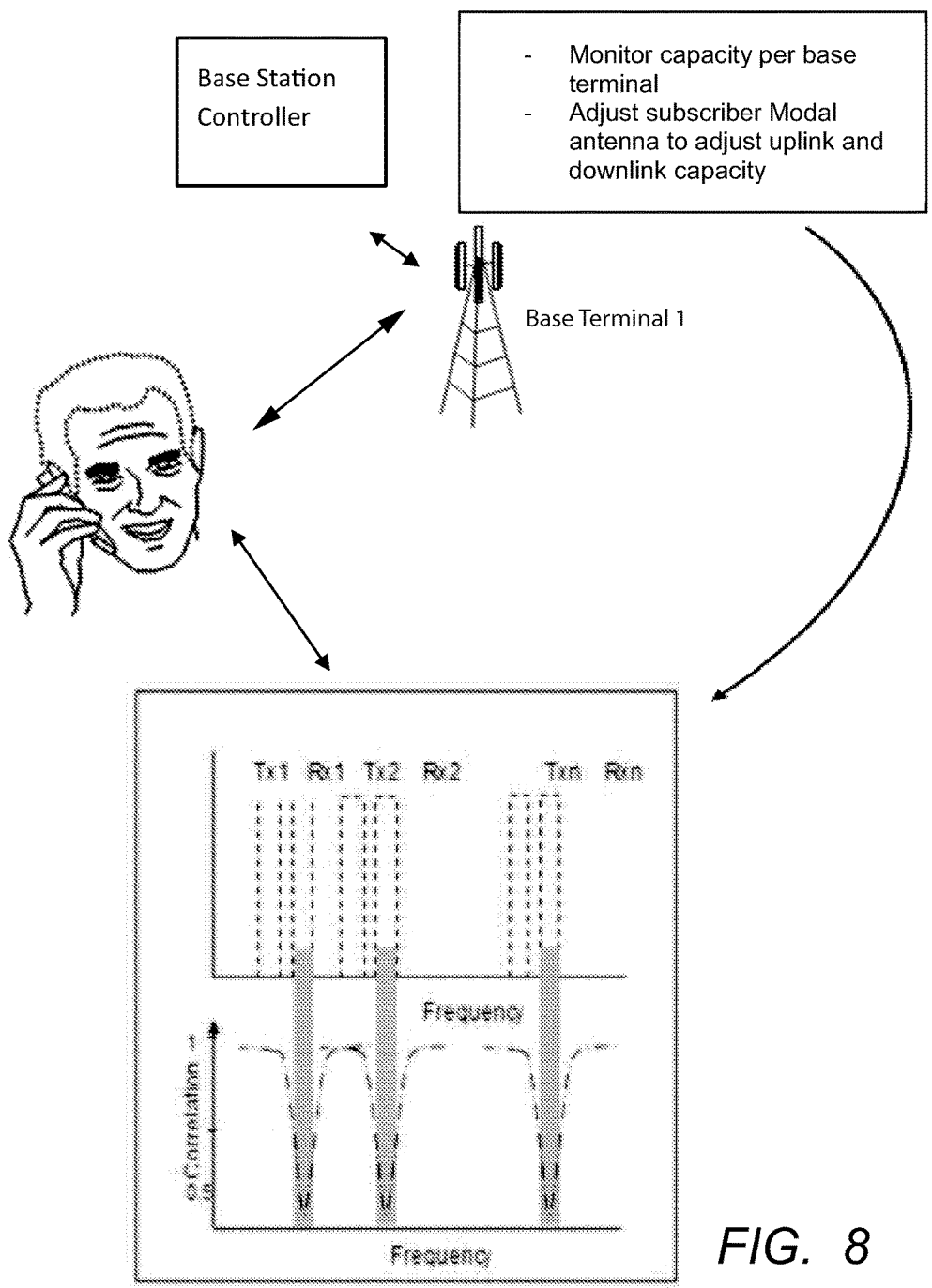
FIG. 8 illustrates a base station controller, base terminal, and a subscriber. The base station controller monitors capacity of the cell, for both uplink and downlink operation. The base station controller sends commands to the subscriber communication device to adjust the Modal antenna to optimize antenna performance to improve cellular system capacity for the required mode of operation: uplink, downlink, or both.

FIG. 8 illustrates a base station controller, base terminal, and a subscriber. The base station controller monitors capacity of the cell, for both uplink and downlink operation. The base station controller sends commands to the subscriber communication device to adjust the Modal antenna to optimize antenna performance to improve cellular system capacity for the required mode of operation: uplink, downlink, or both.

Figure 9:
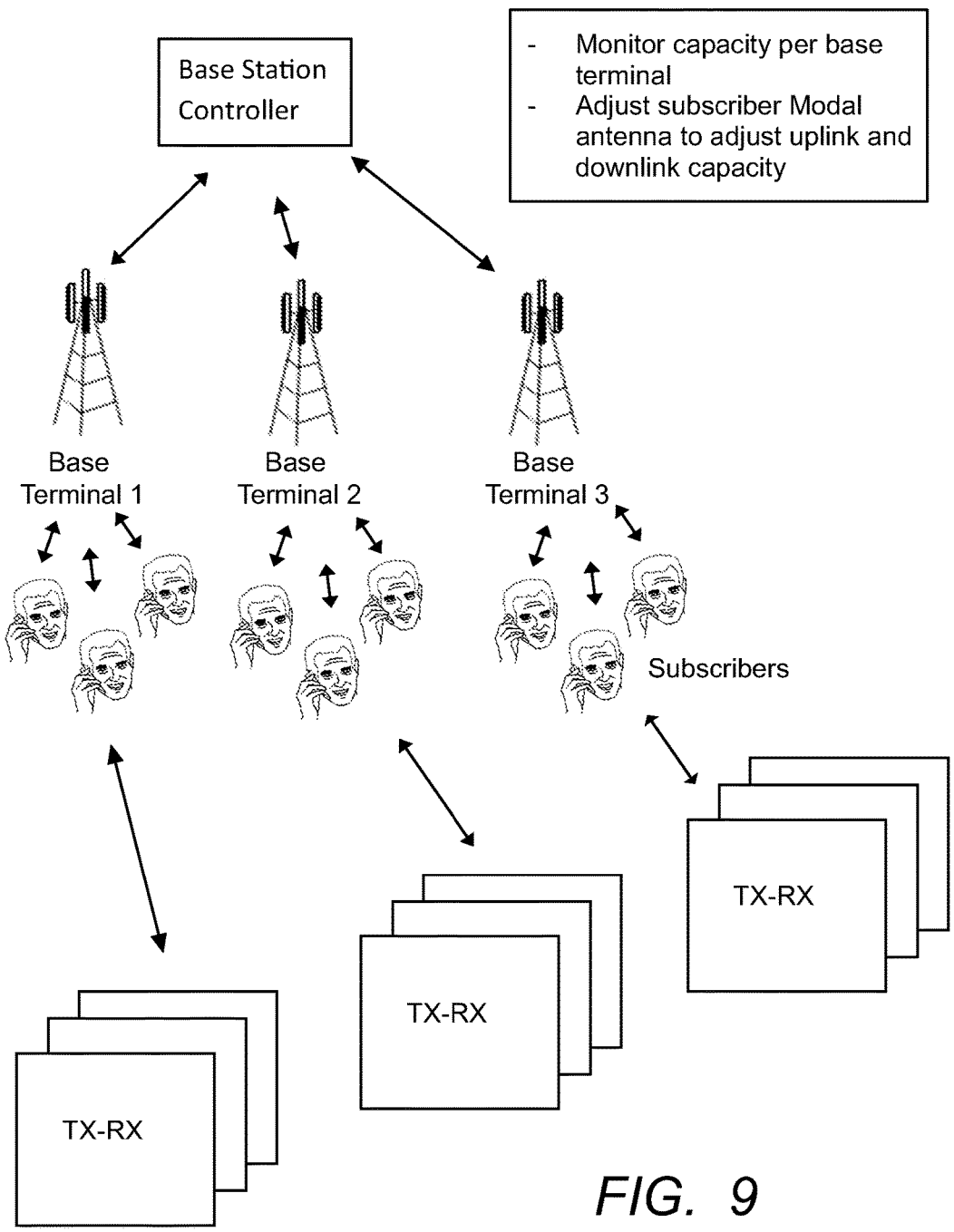
FIG. 9 illustrates a more complete cellular network wherein a base station controller is used to control multiple base terminals. Multiple subscribers are located in the various cells controlled by the base terminals. The base station controller monitors capacity of the cells, for both uplink and downlink operation. The base station controller sends commands to the subscriber communication devices to adjust the Modal antenna to optimize antenna performance to improve cellular system capacity for the required mode of operation: uplink, downlink, or both.

FIG. 9 illustrates a more complete cellular network wherein a base station controller is used to control multiple base terminals. Multiple subscribers are located in the various cells controlled by the base terminals. The base station controller monitors capacity of the cells, for both uplink and downlink operation. The base station controller sends commands to the subscriber communication devices to adjust the Modal antenna to optimize antenna performance to improve cellular system capacity for the required mode of operation: uplink, downlink, or both.

Figure 10:
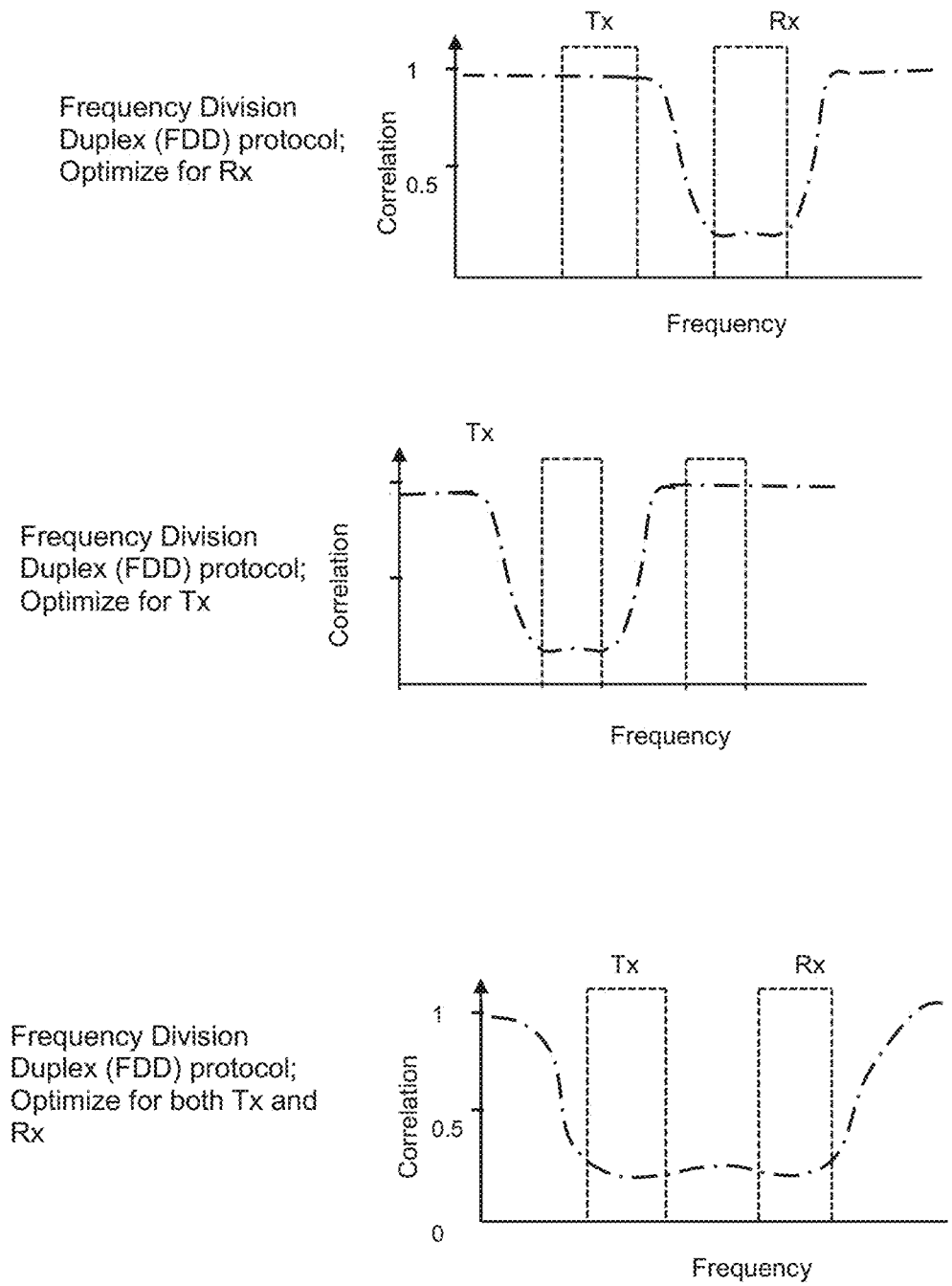
FIG. 10 illustrates the adjustment of correlation of the subscriber antenna system in relation to the propagation channel. For frequency division duplex (FDD) systems the transmit, receive, or both transmit and receive frequency bands of the subscriber communication device can be optimized in terms of channel correlation characteristics. This channel correlation parameter which is improved by altering subscriber antenna system performance is controlled by the base station controller.

FIG. 10 illustrates the adjustment of correlation of the subscriber antenna system in relation to the propagation channel. For frequency division duplex (FDD) systems the transmit, receive, or both transmit and receive frequency bands of the subscriber communication device can be optimized in terms of channel correlation characteristics. This channel correlation parameter which is improved by altering subscriber antenna system performance is controlled by the base station controller.

FIG. 11a illustrates multiple subscriber communication devices in a cellular system. Six base stations are shown, with subscriber communication devices communicating with 5 of the six base stations. Five subscriber communication devices are communicating to base station 1.

FIG. 11b illustrates a capacity diagnostic mode implemented in a cellular system wherein subscriber communication devices in cells adjacent to base station 1 are commanded to connect to base station 1 to increase cell use.

Figure 12:
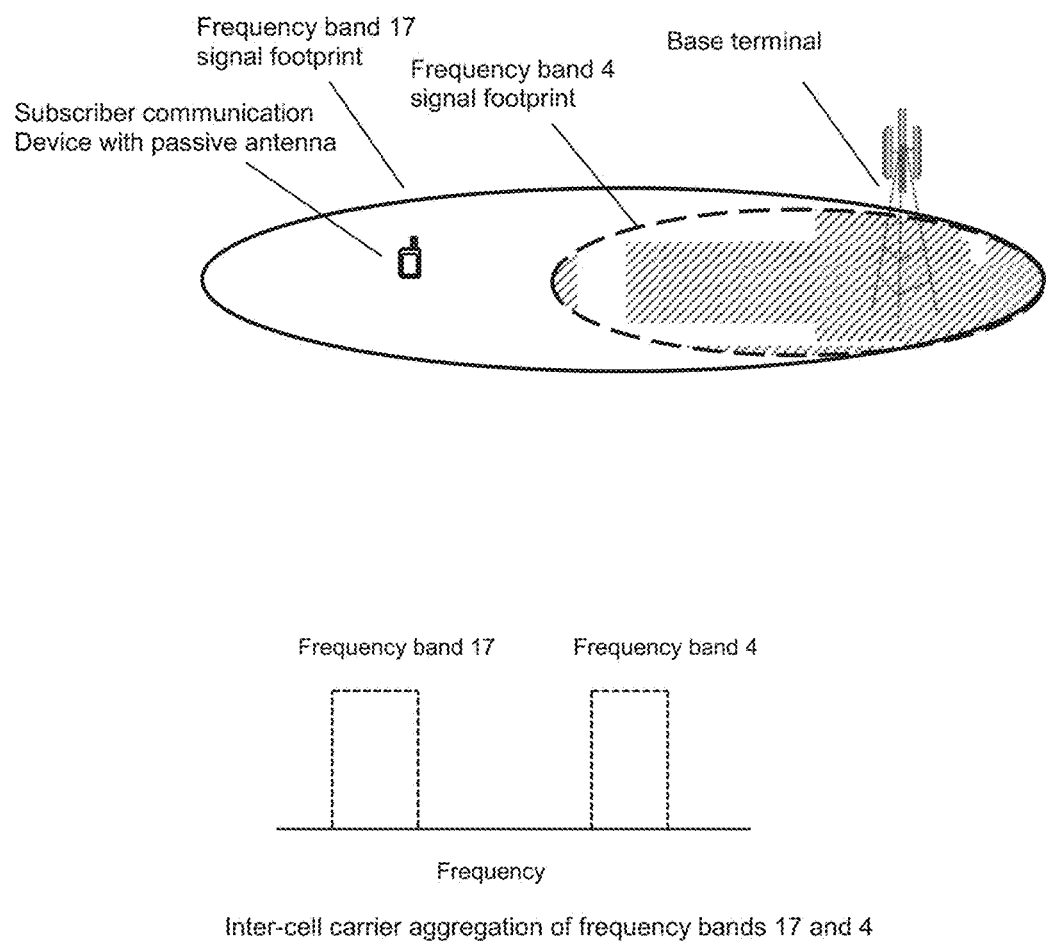
FIG. 12 illustrates normal cellular system operation when inter-cell carrier aggregation is implemented. A base terminal is shown and a low frequency signal footprint, frequency band 17 (704 to 746 MHz), and high frequency signal footprint, frequency band 4 (1710 to 2155 MHz), are shown. A subscriber communication device is shown at a location within the base terminal cell where the low frequency signal is present at a signal level sufficient for communication, but not sufficient for high frequency communication.

FIG. 12 illustrates normal cellular system operation when inter-cell carrier aggregation is implemented. A base terminal is shown and a low frequency signal footprint, frequency band 17 (704 to 746 MHz), and high frequency signal footprint, frequency band 4 (1710 to 2155 MHz), are shown. A subscriber communication device is shown at a location within the base terminal cell where the low frequency signal is present at a signal level sufficient for communication, but not sufficient for high frequency communication.

Figure 13:
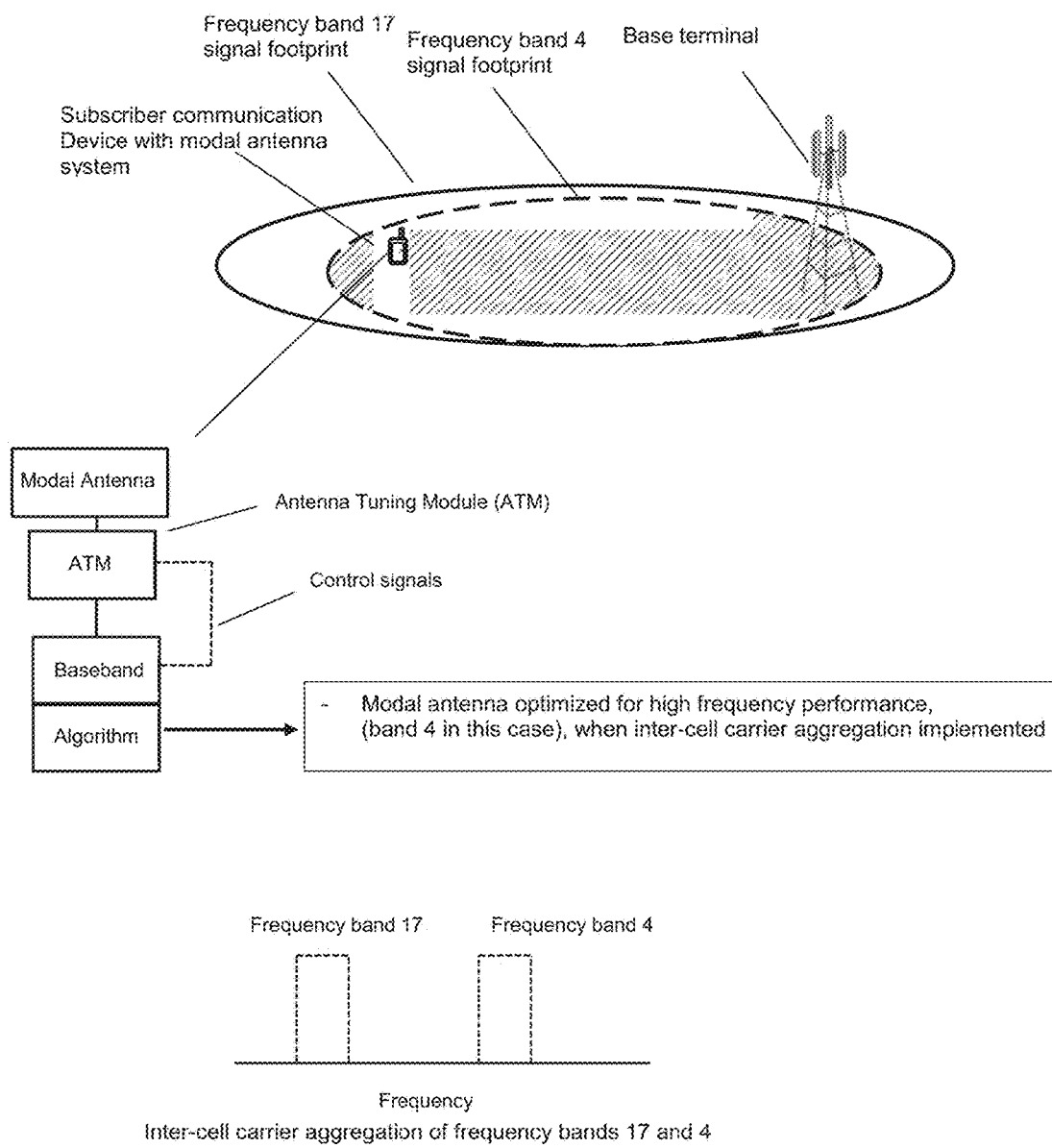
FIG. 13 illustrates cellular system operation when inter-cell carrier aggregation is implemented and a modal antenna system is used in the subscriber communication device. A modal antenna is implemented in the subscriber communication device along with an ATM (Antenna Tuning Module) and algorithm installed in baseband. A base terminal is shown and a low frequency signal footprint, frequency band 17 (704 to 746 MHz), and high frequency signal footprint, frequency band 4 (1710 to 2155 MHz), are shown. A subscriber communication device is shown at a location within the base terminal cell where the low frequency and high frequency signals are present at a signal level sufficient for communication. When inter-cell carrier aggregation is implemented, the modal antenna system is optimized to increase the signal strength footprint at the higher of the two frequency bands to compensate for increased propagation loss at the higher frequency.

FIG. 13 illustrates cellular system operation when inter-cell carrier aggregation is implemented and a modal antenna system is used in the subscriber communication device. A modal antenna is implemented in the subscriber communication device along with an ATM (Antenna Tuning Module) and algorithm installed in baseband. A base terminal is shown and a low frequency signal footprint, frequency band 17 (704 to 746 MHz), and high frequency signal footprint, frequency band 4 (1710 to 2155 MHz), are shown. A subscriber communication device is shown at a location within the base terminal cell where the low frequency and high frequency signals are present at a signal level sufficient for communication. When inter-cell carrier aggregation is implemented, the modal antenna system is optimized to increase the signal strength footprint at the higher of the two frequency bands to compensate for increased propagation loss at the higher frequency.

Figure 14:
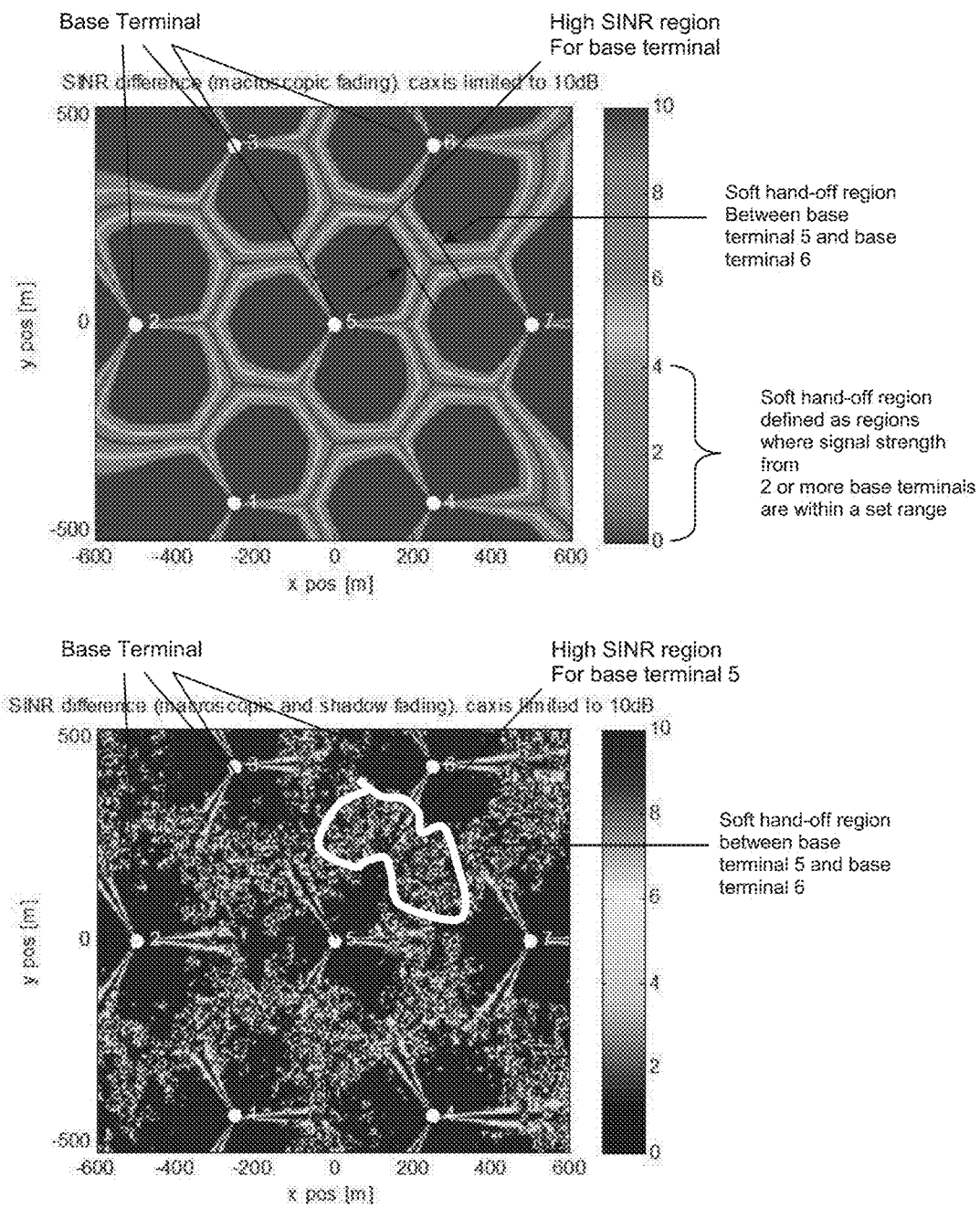
FIG. 14 illustrates signal strength profiles for a seven base terminal cellular system. The soft hand-off region between base terminals is defined, which is a region between two or multiple base terminals were signal strength profiles are within a certain dB range. Signal strength profiles are shown for both macroscopic fading and macroscopic fading and shadowing. An irregularly shaped region is shown in the case with both macroscopic fading and shadowing, with this region being positioned between base terminals 5, 6, and 7 and being defined as a region where the signal strength profiles for these three base terminals are within a set range when compared to each other.

FIG. 14 illustrates signal strength profiles for a seven base terminal cellular system. The soft hand-off region between base terminals is defined, which is a region between two or multiple base terminals were signal strength profiles are within a certain dB range. Signal strength profiles are shown for both macroscopic fading and macroscopic fading and shadowing. An irregularly shaped region is shown in the case with both macroscopic fading and shadowing, with this region being positioned between base terminals 5, 6, and 7 and being defined as a region where the signal strength profiles for these three base terminals are within a set range when compared to each other.

Figure 15:
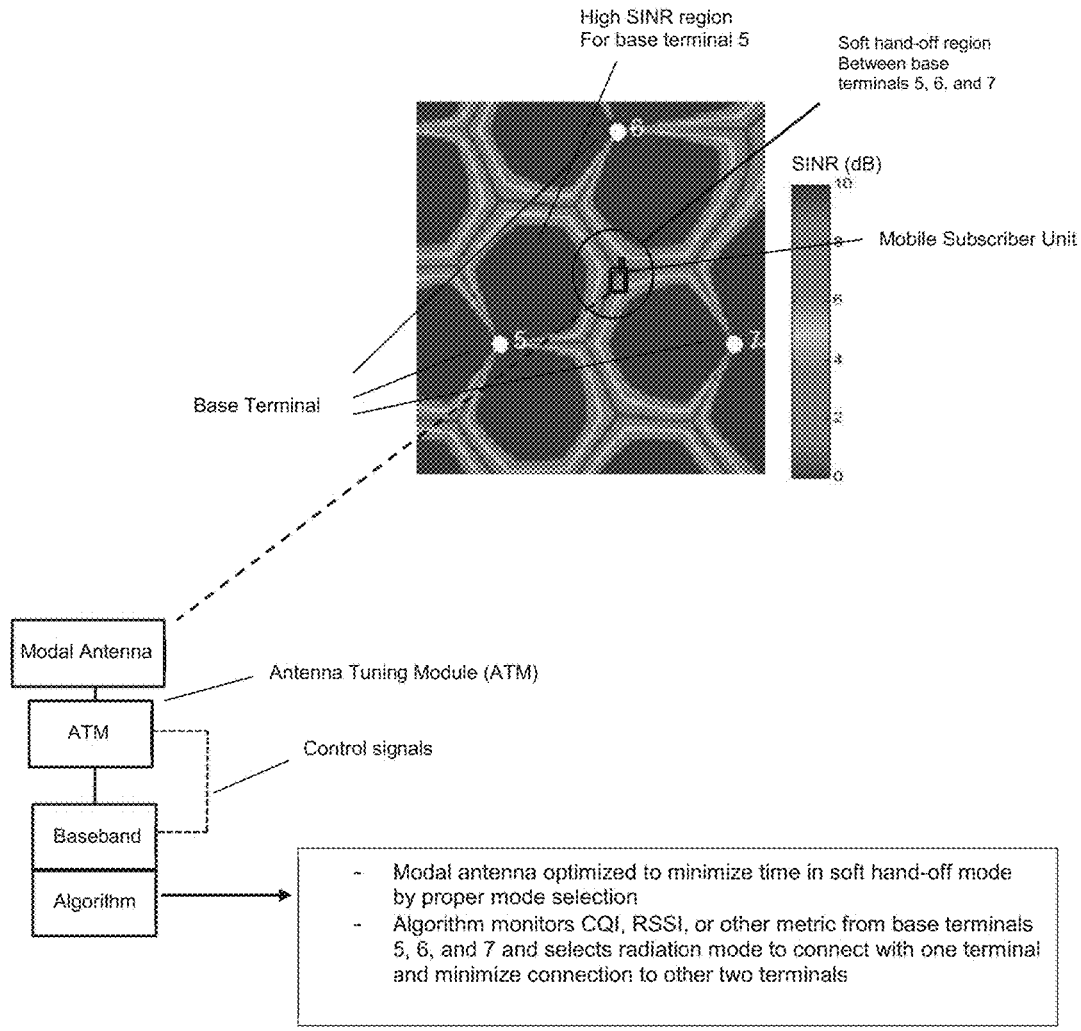
FIG. 15 illustrates a process for improved soft hand-off performance in a cellular system using Modal antennas in the mobile subscriber units. Signal strength profiles for three base terminals in a cellular system are shown. Signal strength profiles are shown for macroscopic fading. A mobile subscriber unit is shown in the soft hand-off region between base terminals 5, 6, and 7. The mobile subscriber unit is described as having a Modal antenna, ATM (Antenna Tuning Module), and baseband containing algorithm. The algorithm is optimized to command a Modal antenna such that the time the mobile subscriber unit is in soft hand-off mode is minimized. The algorithm monitors CQI, RSSI, or other relevant metric from base terminals 5, 6, and 7 and selects the radiation mode to optimize connection with one base terminal, and reduce the link quality with the remaining two base terminals.

FIG. 15 illustrates a process for improved soft hand-off performance in a cellular system using Modal antennas in the mobile subscriber units. Signal strength profiles for three base terminals in a cellular system are shown. Signal strength profiles are shown for macroscopic fading. A mobile subscriber unit is shown in the soft hand-off region between base terminals 5, 6, and 7. The mobile subscriber unit is described as having a Modal antenna, ATM (Antenna Tuning Module), and baseband containing algorithm. The algorithm is optimized to command a Modal antenna such that the time the mobile subscriber unit is in soft hand-off mode is minimized. The algorithm monitors CQI, RSSI, or other relevant metric from base terminals 5, 6, and 7 and selects the radiation mode to optimize connection with one base terminal, and reduce the link quality with the remaining two base terminals.

Figure 16:
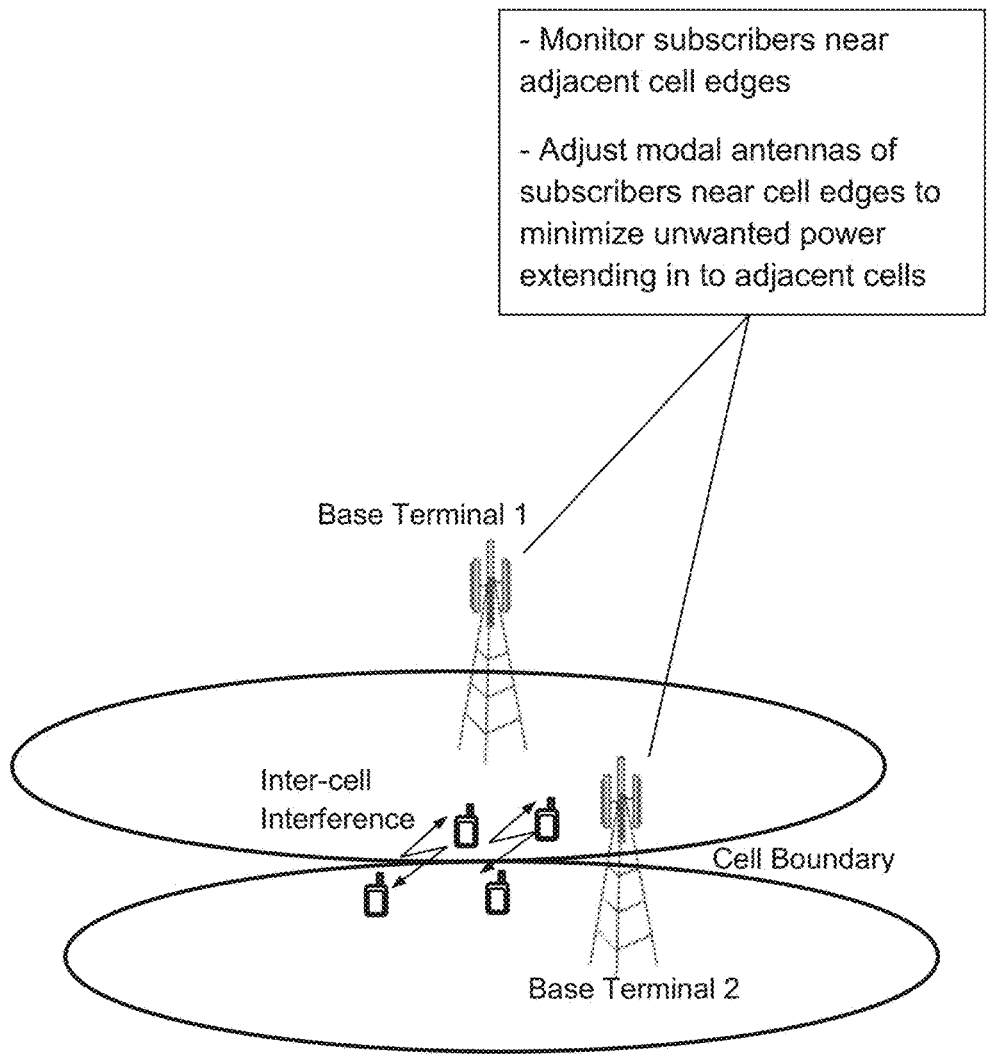
FIG. 16 shows a process for coordinating subscriber modal antennas near cell boundaries in the presence of inter-cell interference. The base terminals 1 and 2 may adjust the modal antennas of users near adjacent cell edges to reduce the inter-cell interference and improve the capacity of the network.

FIG. 16 shows a process for coordinating subscriber modal antennas near cell boundaries in the presence of inter-cell interference. The base terminals 1 and 2 may adjust the modal antennas of users near adjacent cell edges to reduce the inter-cell interference and improve the capacity of the network.

FIG. 17 illustrates an example of how modal antennas may be used in a heterogeneous cell, consisting of a macrocell with a large area footprint and a femtocell and picocell with smaller area footprints. FIG. 17a shows the case in which the capacity of the cell is limited by the large number of users connected to the macrocell. FIG. 17b shows an improved use of cell resources, whereby some subscribers may be commanded to switch to a mode that optimizes connection with one of the smaller area cells.

We claim:
1. A cellular system comprising:
a base station control unit including a processor and an algorithm;
one or more base terminals comprising transceivers the base terminals positioned to form cells defining communication system boundaries;
one or more subscriber communication devices positioned in one or more of the cells, wherein one or more of the subscriber communication devices includes a modal antenna system configured to generate two or more radiation modes at one or more frequency bands used for communication in the cellular system;
the transceivers adapted for communication with the one or more subscriber communication devices;
the base station control unit being configured to control a selected mode of the two or more radiation modes of the modal antenna systems in the subscriber communication devices to improve or alter capacity in one or more of the cells of the cellular system;
further characterized in that:
with one or more of the subscriber communication devices being configured in communication with a first of the one or more base terminals;
the base station control unit is configured to control the modal antenna system of the one or more of the subscriber communication devices configured in communication with the first base terminal to optimize a communication link with a second of the one or more base terminals in the cellular system to provide a continuation of service or improved service when the first base terminal has degraded performance.

2. The cellular system of claim 1, wherein said capacity is altered or improved for one of: uplink or downlink communication performance.

3. The cellular system of claim 1, wherein said capacity is altered or improved for both downlink and uplink communication performance.

4. The cellular system of claim 1, wherein said capacity is altered or improved for downlink communication performance at two or more of the frequency bands used for communication in the cellular system.

5. The cellular system of claim 4, wherein said capacity is altered or improved for uplink communication performance in the two or more of the frequency bands.

6. The cellular system of claim 4, wherein said capacity is altered or improved for both downlink and uplink communication performance in the two or more of the frequency bands.

7. The cellular system of claim 4, wherein said capacity is altered or improved at a combination of uplink and downlink at one the two or more of the frequency bands.

8. The cellular system of claim 1, wherein the base station control unit adjusts the modal antenna system in multiple subscriber communication devices to optimize the communication link with multiple base terminals in the cellular system other than the first base terminal that the multiple subscriber communication devices are communicating with to provide a continuation of service or improved service when the first base terminal has degraded performance due to at least partial failure in first base terminal equipment or at least partial failure in the control of the first base terminal.

9. A cellular system comprising:
a base station control unit including a processor and an algorithm;
one or more base terminals comprising transceivers the base terminals positioned to form cells defining communication system boundaries;
one or more subscriber communication devices positioned in one or more of the cells, wherein one or more of the subscriber communication devices includes a modal antenna system configured to generate two or more radiation modes at one or more frequency bands used for communication in the cellular system;
the transceivers adapted for communication with the one or more subscriber communication devices;
wherein the base station control unit is configured to control a selected mode of the two or more radiation modes of the modal antenna systems in the subscriber communication devices to improve or alter capacity for downlink in one or more of the cells of the cellular system;
wherein said capacity is altered or improved at uplink, downlink, or a combination of uplink and downlink at the two or more of the frequency bands; and
wherein the base station control unit is configured to control the mode of the modal antenna system in each of a plurality of the subscriber communication devices within a first of the cells and wherein the base station control unit is further configured to control the mode of the modal antenna system in each of a plurality of the subscriber communication devices within one or a plurality of adjacent cells being adjacent to the first cell in the cellular system to approach or exceed capacity in the first cell, the modal antenna systems in the subscriber communication devices located in adjacent cells are commanded to communicate with the base terminal in the first cell to increase usage in the first cell.

10. A cellular system comprising:
a base station control unit including a processor and an algorithm;
one or more base terminals comprising transceivers the base terminals positioned to form cells defining communication system boundaries;
one or more subscriber communication devices positioned in one or more of the cells, wherein one or more of the subscriber communication devices includes a modal antenna system configured to generate two or more radiation modes at one or more frequency bands used for communication in the cellular system;
the transceivers adapted for communication with the one or more subscriber communication devices;
wherein the base station control unit is configured to control a selected mode of the two or more radiation modes of the modal antenna systems in the subscriber communication devices to improve or alter capacity for downlink in one or more of the cells of the cellular system;
wherein said capacity is altered or improved at uplink, downlink, or a combination of uplink and downlink at the two or more of the frequency bands; and
wherein the modal antenna in one or more of the subscriber communication devices is commanded to optimize communication link performance at a selected frequency band or frequency channel when two or more frequency bands or frequency channels are used simultaneously to improve instantaneous bandwidth for a transmitted signal, receive signal, or both transmitted and received signal.

11. A cellular system comprising:
a base station control unit including a processor and an algorithm;
one or more base terminals comprising transceivers the base terminals positioned to form cells defining communication system boundaries;
one or more subscriber communication devices positioned in one or more of the cells, wherein one or more of the subscriber communication devices includes a modal antenna system configured to generate two or more radiation modes at one or more frequency bands used for communication in the cellular system;
the transceivers adapted for communication with the one or more subscriber communication devices;
wherein the base station control unit is configured to control a selected mode of the two or more radiation modes of the modal antenna systems in the subscriber communication devices to improve or alter capacity for downlink in one or more of the cells of the cellular system;
wherein said capacity is altered or improved at uplink, downlink, or a combination of uplink and downlink at the two or more of the frequency bands; and
wherein the modal antenna in one or more of the subscriber communication devices is commanded to optimize communication link performance at two or more frequency bands or frequency channels when two or more frequency bands or frequency channels are used simultaneously to improve instantaneous bandwidth for a transmitted signal, receive signal, or both transmitted and received signal.

12. A cellular system comprising:
a base station control unit including a processor and an algorithm;

one or more base terminals comprising transceivers the base terminals positioned to form cells defining communication system boundaries;

one or more subscriber communication devices positioned in one or more of the cells, wherein one or more of the subscriber communication devices includes a modal antenna system configured to generate two or more radiation modes at one or more frequency bands used for communication in the cellular system;

the transceivers adapted for communication with the one or more subscriber communication devices;

wherein the base station control unit is configured to control a selected mode of the two or more radiation modes of the modal antenna systems in the subscriber communication devices to improve or alter capacity for downlink in one or more of the cells of the cellular system;

wherein said capacity is altered or improved at uplink, downlink, or a combination of uplink and downlink at the two or more of the frequency bands; and wherein the modal antenna in one or more of the subscriber communication devices at inter-cellular boundaries is commanded to minimize power extending in to neighboring cells for mitigating inter-cell interference and improving network capacity where neighboring cells are unable to efficiently re-use communication resources including one or more of the group consisting of: time, frequency, and code words.

* * * * *